US012783529B2

(12) United States Patent
Xiao et al.

(10) Patent No.: US 12,783,529 B2
(45) Date of Patent: Nov. 3, 2026

(54) MACHINE LEARNING-BASED RANKING OF COLD-START ITEMS IN SEARCH SYSTEMS USING PREDICTED INTERACTION RATES

(71) Applicant: Maplebear Inc., San Francisco, CA (US)

(72) Inventors: Xiao Xiao, San Diego, CA (US); Lee Cohn, Chicago, IL (US); Taesik Na, Issaquah, WA (US); Vinesh Reddy Gudla, South San Francisco, CA (US); Tejaswi Tenneti, San Carlos, CA (US); Quan Kong, Coquitlam (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/042,013

(22) Filed: Jan. 31, 2025

(65) Prior Publication Data

US 2026/0228228 A1 Aug. 6, 2026

(51) Int. Cl.

*G06F 16/20* (2019.01)
*G06F 16/2457* (2019.01)
*G06F 16/9538* (2019.01)

(52) U.S. Cl.

CPC .... *G06F 16/24578* (2019.01); *G06F 16/9538* (2019.01)

(58) Field of Classification Search

None
See application file for complete search history.

(56) References Cited

U.S. PATENT DOCUMENTS

2024/0256578 A1* 8/2024 Bhardwaj ............. G06F 16/288

* cited by examiner

*Primary Examiner* — Belix M Ortiz Ditren
(74) *Attorney, Agent, or Firm* — Fenwick & West LLP

(57) ABSTRACT

An online system predicts the likelihood of user interactions with new items with little or no historic performance data by leveraging historic performance data of similar items. The online system identifies similar items by comparing item embeddings for new items and other, established items of the online system. Based on the historic performance data of the similar items, the online system predicts a baseline interaction rate for new items, which may be used in various ranking or selection processes for presenting the cold start items to users. As the online system gathers user interaction data for the cold start items, the new user interaction data may be blended with the predicted baseline interaction rate until sufficient data is collected.

18 Claims, 5 Drawing Sheets

MACHINE LEARNING-BASED RANKING OF COLD-START ITEMS IN SEARCH SYSTEMS USING PREDICTED INTERACTION RATES

BACKGROUND

Online systems often rank and present content items to users based on an expected interaction rate, which represents the likelihood that a user will engage with a given item (e.g., by clicking, viewing, or reacting to the item). Traditionally, expected interaction rates are determined using historical engagement data. But completely new items (which lack any historical data) and newer items (which have limited historical data) often receive inaccurate rankings under this approach. As a result, these "cold-start" items may be improperly ranked relative to other items, leading to reduced visibility and suboptimal presentation to users.

Accurately predicting expected interaction rates for cold-start items presents significant technical challenges. Without sufficient historical data, conventional machine learning models used for ranking struggle to generalize, often leading to either under-representation (where cold-start items are ranked too low and remain undiscovered) or over-representation (where models overcompensate and prioritize items without justification). Additionally, naive approaches that incorporate data from similar items may introduce noise or inaccuracies due to contextual differences or variations in user behavior. These challenges highlight the need for a technical solution capable of leveraging sparse or incomplete data to generate accurate interaction rate predictions for cold-start items.

SUMMARY

In accordance with one or more aspects of the disclosure, an online system predicts interaction rates for cold start items based on historic interaction rates of other relevant items. When users of the online system submit a search query for items for presentation, the online system determines query embeddings describing the search query. Query embeddings may be compared to item embeddings describing various items on the online system to predict the relevance of an item to the search query. In other words, item embeddings, representing item characteristics, and query embeddings, representing search query characteristics, may be used to determine item relevance. However, in addition to query-item relevance, the online system selects items for presentation to users based on user interaction rates describing a likelihood of a user interacting with an item. These user interaction rates are based on historic interaction rate data for items.

For cold start items that are new or newer to the online system and have little to no historic interaction rate data, the online system predicts baseline interaction rates based on historic interaction rate data of other relevant items, e.g., similar items sharing item embeddings with the cold start items or items having similar query-item relevance scores with the cold start items. The baseline interaction rate may be used by the online system in scoring or ranking items for presentation to the user in response to the search query. As cold start items are presented to users of the online system and new interaction rate data is gathered, the baseline interaction rate may be blended with the new interaction rate data to increase the accuracy of the expected interaction rate for the cold start items. In this way, the baseline interaction rate may be used in combination with query-item relevance when ranking items.

In some embodiments, the online system additionally modifies baseline interaction rates based on positional information associated with the historic interaction rate data. Because interaction with items is heavily impacted by the positioning of items (e.g., an item presented to a user at the bottom of a page being less likely to receive interaction than an equivalent item at the top of a page), the online system may discount historic interaction rate data associated with lower positions. In this way, the system may adjust the predicted interaction rates based on positional information, not just the historical interaction rates.

Accordingly, embodiments of the invention address the technical problems of existing machine learning models using computational techniques such as embedding-based similarity searches and probabilistic modeling to improve the predictive ability of the models.

DETAILED DESCRIPTION

Figure 1:
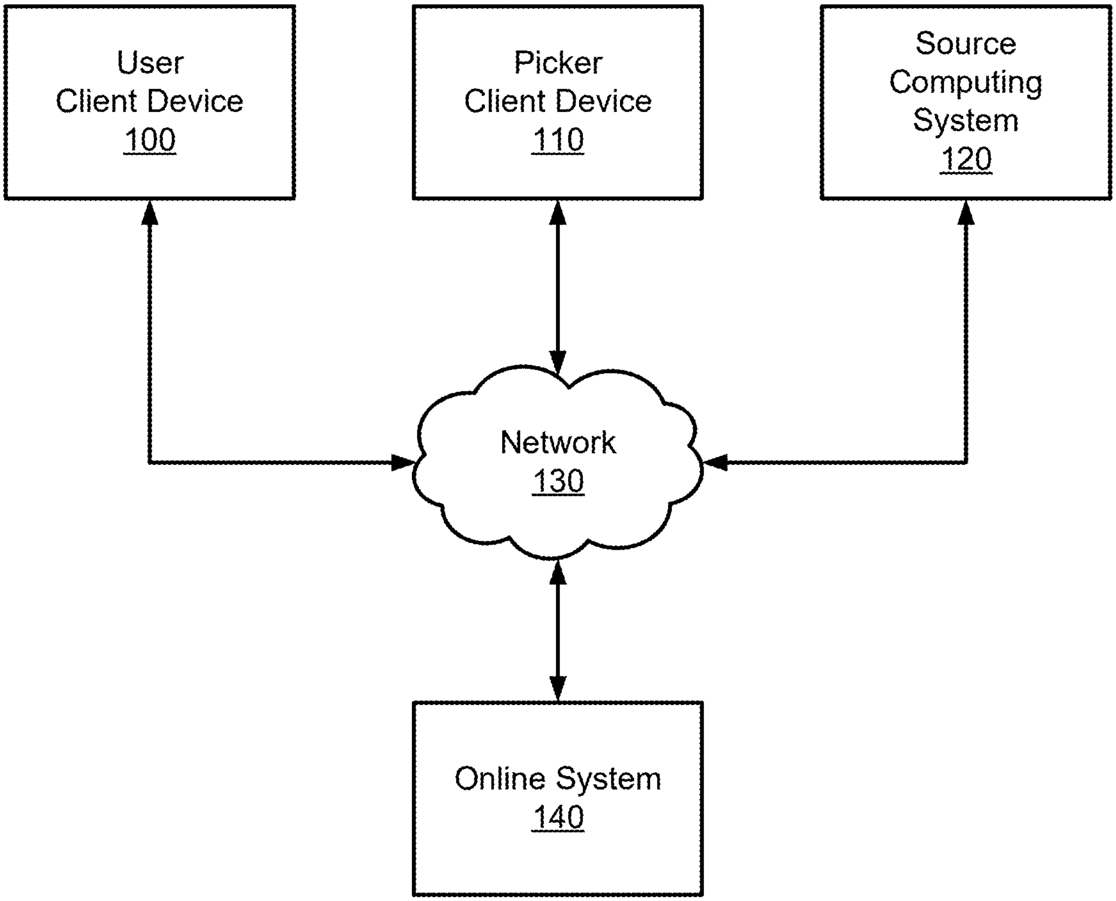
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a quick response (QR) code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
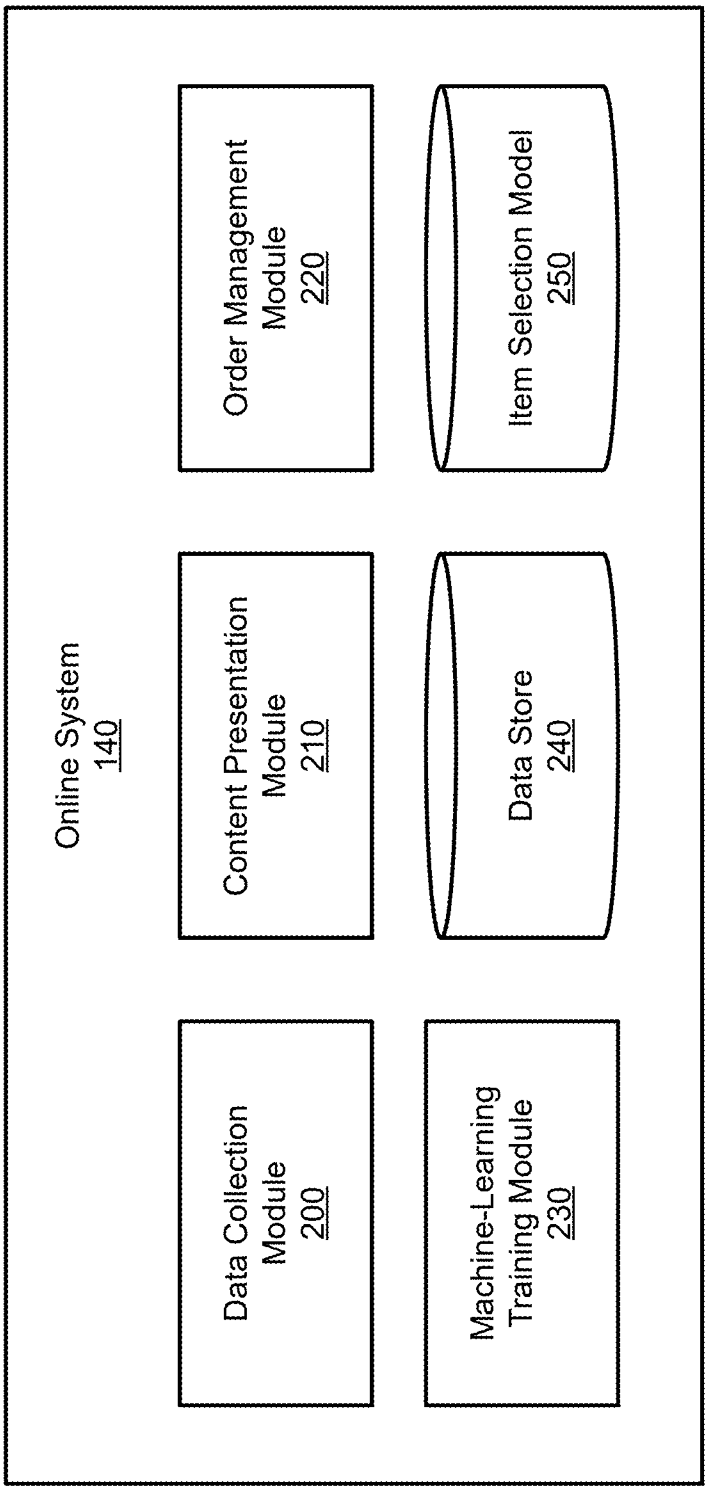
FIG. 2 illustrates an example system architecture for an online system, in accordance with one or more embodiments.

FIG. 2 illustrates an example system architecture for an online system 140, in accordance with one or more embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model 250 to score items for presentation to a user. An item selection model 250 is a machine-learning model that is trained to score items for a user based on item data for the items and user data for the user. For example, the item selection model 250 may be trained to determine a likelihood that the user will interact with or order the item. In some embodiments, the item selection model 250 uses item embeddings describing items and user embeddings describing users to score items. These item embeddings and user embeddings may be generated by separate machine-learning models and may be stored in the data store 240.

In some embodiments, the item selection model 250 uses historic interaction data associated with items to determine a likelihood that the user will interact with or order the item. Historic interaction data may describe, for example, how often an item receives interactions (e.g., conversion, click-through, or other selection by a user), responsive to the item being presented on the online system. Historic interaction data may also include other information describing the interaction, such as positional information, surrounding items, price of the item, discounts applied to the item, or the like. Historic interaction data may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

As discussed above, the online system 140 may select items for presentation to users in response to receiving search queries by determining a likelihood of user interaction with the items. The likelihood of user interaction with items, represented as a user interaction rate, may depend on various factors, such as position of an item on an interface of the online system 140, relevance of an item to a search query, user preferences, item or brand information, etc.

Figure 3:
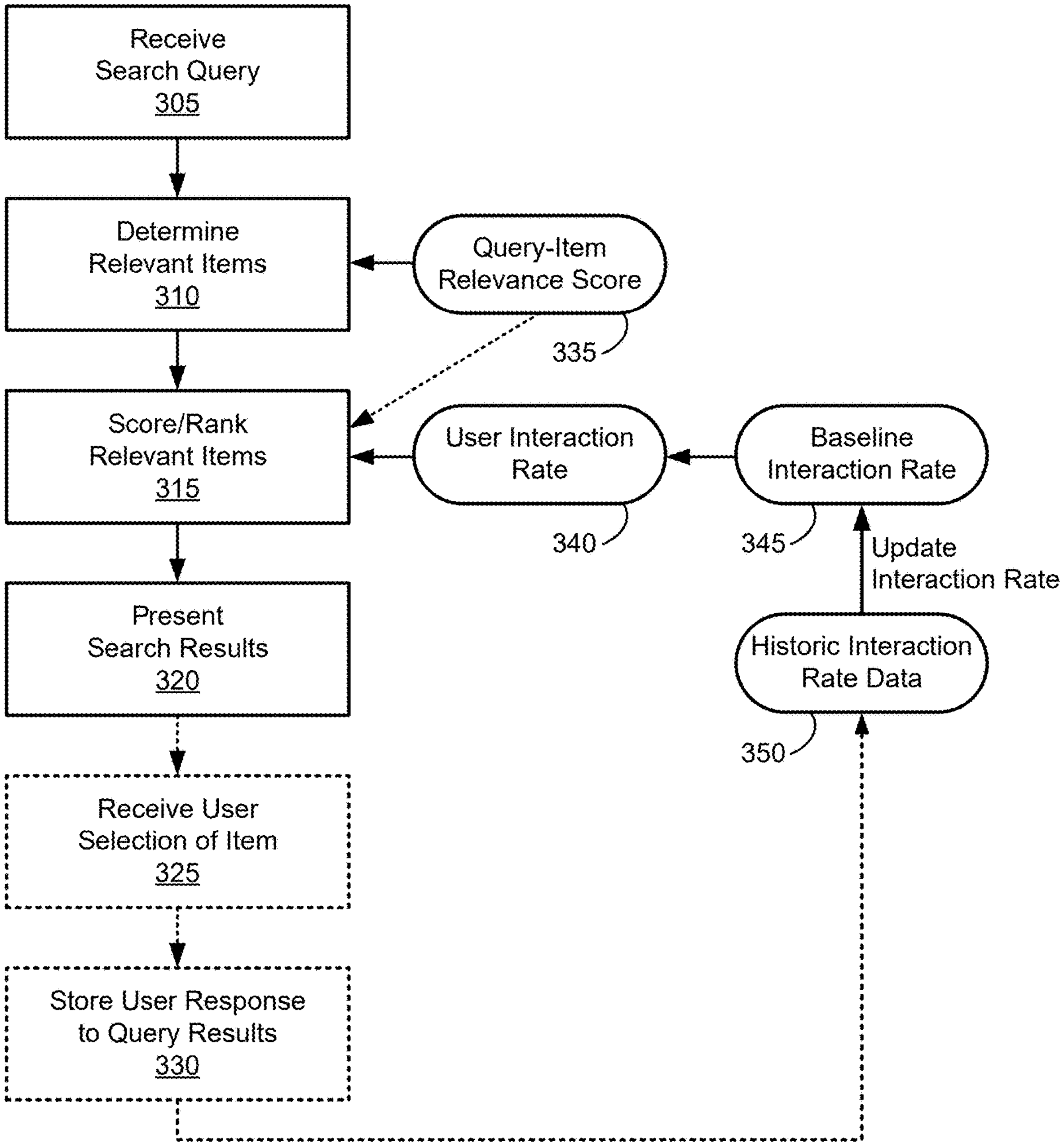
FIG. 3 is a flow diagram illustrating an example ranking and selection process using user interaction rate and query-item relevance scores, in accordance with one or more embodiments.

FIG. 3 is a flow diagram illustrating an example ranking and selection process using user interaction rate and query-item relevance scores, in accordance with one or more embodiments. Search queries received 305 by the online system 140 from user client devices 100 may be used to indicate items of interest to the user. The online system 140 may apply natural language processing (NLP) techniques to received search queries to generate query embeddings representing characteristics of the search query. Query embeddings may be compared to item embeddings to determine a query-item relevance score 335 for each item with respect to the search query. Higher query-item relevance scores 335 represent a higher likelihood that the item fulfills the search query and that the user may be more likely to interact with the item.

Based on the query-item relevance scores 335, the online system may determine 310 a set of relevant items to the search query. In some embodiments, the set of relevant items may be all items having query-item relevance scores 335 above a threshold value. In other embodiments, the set of relevant items may be a threshold number of items having the highest query-item relevance scores 335 (e.g., a set of 25 items having the highest query-item relevance scores).

The online system 140 ranks 315 the set of relevant items for presentation to the user. In some embodiments, the item selection model 250 of the online system 140 ranks the set of relevant items based on baseline interaction rates 345, the baseline interaction rates describing expected performance of an item based on past performance of the item, e.g., a likelihood of a user interacting with the item. The baseline interaction rates 345 may be agnostic to a particular user. In some embodiments, the online system 140 ranks the set of relevant items based on a user interaction rate 340, the user interaction rate representing a likelihood of the given user interacting with a given item of the set of relevant items. The user interaction rate 340 may be determined by the online system based at least, in part, on user embeddings describing characteristics and actions of the user on the online system and the baseline interaction rate 345 corresponding to a given item. As such, the user interaction rate 340 modifies the baseline interaction rate 345 of a given item with respect to a particular user to more accurately represent a likelihood of the particular user interacting with that item. In one or more embodiments, the ranking may be based on both the baseline interaction rates and the query-item relevance scores.

In various embodiments, the online system 140 determines baseline interaction rates 345 for items based on historic interaction rate data 350 stored by the online system. The historic interaction rate data 350 may include, for example, a number of times that an item has been previously presented to users of the online system 140 and a number of times that the item received user interaction. To determine an accurate baseline interaction rate 345 for an item, the online system 140 ideally a minimum amount of historic interaction rate data 350 is stored in association with the item to describe its interaction rate. Items with insufficient historic interaction rate data 350, such as new or newer "cold start" items, may result in inaccurate baseline interaction rates 345 (when based exclusively on data from that item) and consequently be improperly ranked in comparison to other items.

In various embodiments, the online system 140 determines baseline interaction rates 345 for items based at least in part on positional information associated with historic interaction rate data 350. Items are less likely to receive interactions when they are presented in disadvantageous or lower-ranked positions (e.g., lower on an interface) as a sidebar of an interface, etc. in comparison to higher-ranked positions, e.g., at the top or middle of an interface. As a result, baseline interaction rates 345 for items presented in lower-ranked positions are lower than baseline interaction rates for the same items presented in better positions, and may result in the historic interaction rate data 350 gathered from these instances of items being displayed being lower than historic interaction rate data gathered from instances of the item being displayed with better position. To accommodate discrepancies from item positions, in some embodiments, the online system 140 applies a discount to expected historic interaction rate data associated with better positions, so as to accurately account for the impact of historic interaction rate data gathered from higher-ranked positions on the baseline interaction rate 345 for an item. For example, the online system 140 may discount expected interaction rate data by a multiplier of 0.80 for an instance of an item presented in the middle of an interface and a multiplier of 0.90 for an instance of an item presented at the bottom of an interface, while historic interaction rate data for an instance of the item presented at the top of an interface is not discounted. That is, the actual interaction rates for items presented in worse-rated positions may be adjusted to account for the lower expected rates of those locations. In other embodiments, the online system 140 may otherwise discount or modify historic interaction rate data based on positional information.

In some embodiments, the online system 140 ranks the set of relevant items based on both query-item relevance scores 335 and user interaction rates 340. Thus, the ranking accounts for expected relevance of an item to the search query as well as user interaction rate. As such, items having a high expected relevance and a high user interaction rate are more likely to be highly placed on a resulting list of items, while items having high query-item relevance scores 335 but low user interaction rates 340 may be placed higher or lower than other items that are relatively lower in relevance but are expected to have higher user interaction, and vice versa.

The online system 140 presents 320 the ranked set of relevant items to the user via the user client device 100. Responsive to the user interacting with one or more of the items, the online system 140 receives 325 and stores 330 user interaction data describing the interaction. In some embodiments, the user interaction data is stored in association with historic interaction rate data 350 corresponding to each of the items of the ranked set of relevant items, thus updating the baseline interaction rate 345 for each of the items to improve the accuracy of the calculated baseline interaction rate over time as the amount of historic interaction rate data increases.

In various embodiments, the online system 140 may store historic interaction rate data 350 in bins based on expected relevance of the item to a search query. This enables the online system 140 to determine expected baseline interaction rates 345 relative to search query relevance in future ranking and selection processes. For example, the online system 140 may store historic interaction rate data 350 in bins according to query-item relevance score 335, such that historic interaction rate data with a query-item relevance score between 1 and 0.8 is stored separately from historic interaction rate data for the same item with a query-item relevance score between 0.79 and 0.5. Future ranking and selection processes may thus account for items that are consistently high- or low-performing and items that are high-performing only with high relevance to search queries. For example, some items of the online system 140 may have high baseline interaction rates only for instances when the items also have high query-item relevance scores, whereas other items may have consistently high baseline interaction rates even when their respective query-item relevance score may be lower.

When new items are added to the online system 140, it may be difficult for the online system to predict baseline interaction rates for the new items until sufficient interaction rate data has been gathered. Because the online system 140, as described above, uses historic performance data (such as historic interaction rate data) to predict future performance for items and thus to decide which items to present to users, new items with no historic performance data or newer items with insufficient performance data, termed "cold start" items, may be improperly ranked in comparison to other items. This may lead the online system 140 to present them incorrectly, e.g., either presenting them in positions or in response to search queries where they are less relevant or likely to be chosen than other items, or failing to present them in positions or in response to search queries where they would likely be chosen by a user.

The online system 140 uses other relevant items with historical performance data to predict a baseline interaction rate for cold start items that would otherwise have insufficient data to determine an accurate baseline interaction rate. The predicted baseline interaction rate may then be used by various downstream processes of the online system 140, such as when the cold start item is ranked against other items for presentation to users.

Figure 4:
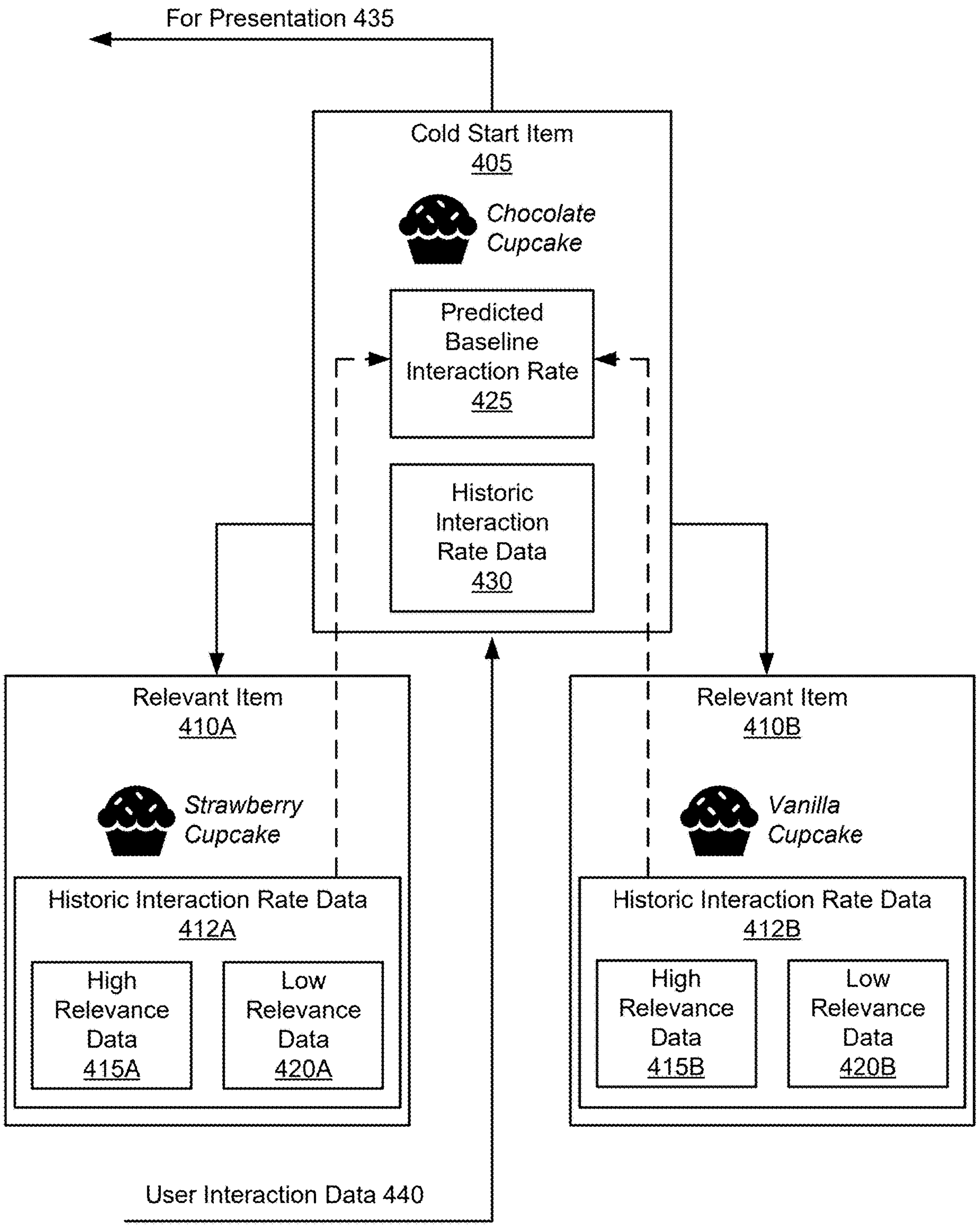
FIG. 4 is a flow diagram illustrating an example process for predicting baseline interaction rates of cold start items based on similar items, in accordance with one or more embodiments.

FIG. 4 is a flow diagram illustrating an example process for predicting baseline interaction rates of cold start items based on other relevant items, in accordance with one or more embodiments. In the example of FIG. 4, a cold start item 405 is associated with one or more item embeddings describing characteristics of the cold start item. The cold start item 405 may have no historic interaction rate data (e.g., it is an item that is newly added to the online system 140) or may have an insufficient amount of historic interaction rate data to calculate a meaningful baseline interaction rate. Responsive to the online system 140 selecting the cold start item 405 as a relevant item for a search query submitted by a user, the online system predicts a baseline interaction rate 425 for the cold start item based on other relevant items 410A-B, wherein the other relevant items are associated with sufficient historic interaction rate data 412. The other relevant items 410A-B are selected as being representative of the cold start item 405 with respect to the search query to enable a sufficiently accurate predicted baseline interaction rate 425. For example, the online system 140 may calculate a baseline interaction rate 425 for the cold start item 405 by compiling or averaging historic interaction rate data 412 associated with the other relevant items 410A-B.

In some embodiments, the online system 140 determines the other relevant items 410A, B based on item embeddings of the cold start item 405 and the other relevant items. Other items may be considered similar to the cold start item 405 when they share more than a threshold similarity of item embeddings (e.g., as measured by a cosine similarity between the embeddings). In other embodiments, the online system 140 determines the other relevant items 410A, B based on query-item relevance scores, wherein the other items are considered to be similarly representative of the cold start item 405 when they share similar query-item relevance scores to the same search query. The online system 140 retrieves the historic interaction rate data 412A, B of the relevant items 410A, B to predict the baseline interaction rate 425 of the cold start item 405.

In some embodiments, the historic interaction rate data 412 may be binned based on relevance to improve the accuracy of calculated and predicted baseline interaction rates. In the example of FIG. 4, historic interaction rate data 412 is binned based on relevance to search queries, such that historic interaction rate data associated with high relevance to search queries is stored separately from historic interaction rate data associated with low relevance to search queries, enabling the online system to accurately differentiate baseline interaction rates between items that are consistently high-performing regardless of relevance to search queries and items that are high-performing only when highly relevant to search queries While the example of FIG. 4 shows historic interaction rate data 412 binned into high relevance data 415 and low relevance data 420, in other embodiments the historic interaction rate data may be binned into according to different or additional thresholds.

The online system 140 may determine which bin of historic interaction rate data 412 to access based on a query-item relevance score for the cold start item 405 to a search query. Historic interaction rate data 412 associated with a similar query-item relevance score is more likely to be representative of expected performance for the cold start item 405 in the context of the particular search query. For example, when the cold start item 405 is selected for a search query with a high query-item relevance score, the online system calculates the predicted baseline interaction rate 425 for the cold start item 405 based on high relevance data 415A, B from relevant items 410A, B. In another example, when the cold start item 405 is selected for a search query with a low query-item relevance score, the online system calculates the predicted baseline interaction rate 425 for the cold start item based on low relevance data 420A, B from relevant items 410A, B. In other examples, historic interaction rate data 412 may be binned differently, e.g., based on different metrics or parameters, with more or less bins than shown in FIG. 4.

As the cold start item 405 is presented 435 on the online system 140, user interaction data 440 may be gathered for the cold start item and stored as historic interaction rate data 430. However, as the cold start item 405 begins to be presented, the historic interaction rate data 430 may not necessarily be sufficient immediately to calculate an accurate baseline interaction rate alone. In some embodiments, as cold start items accrue historic interaction rate data 430, the online system 140 blends the predicted baseline interaction rate 425 based on similar items 410 with the historic interaction rate data of the cold start item. The online system 140 may blend the data proportionally to a number of instances of the cold start item 405 being presented, e.g., weighting the predicted baseline interaction rate 425 at 90% and the historic interaction rate data 430 of the cold start item at 10% while the cold start item has a small amount of historic interaction rate data. The online system 140 may adjust the baseline interaction rate periodically to include new historic interaction rate data 430 for the cold start item, or may adjust the baseline interaction rate when the cold start item meets threshold amounts of historic interaction rate data.

Figure 5:
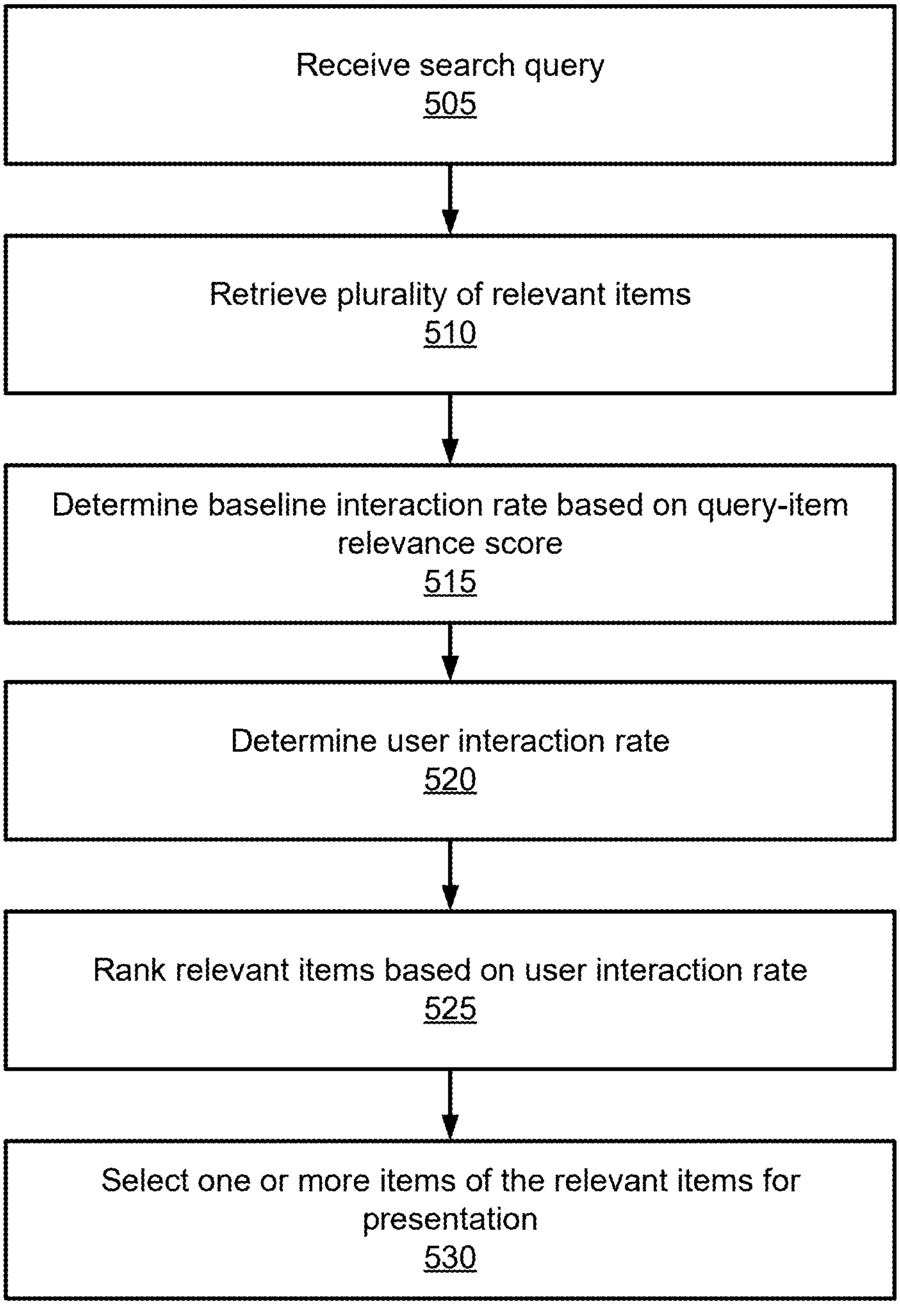
FIG. 5 is a flowchart for a method of selecting items for presentation in response to a search query based on baseline interaction rates, in accordance with one or more embodiments.

FIG. 5 is a flowchart for a method of selecting items for presentation in response to a search query based on baseline interaction rates, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system 140 receives 505 a search query from a user, the search query comprising a request to view items that are available through the online system. Each search query is associated with various characteristics described by query embeddings.

The online system 140 retrieves 510 a plurality of relevant items. In some embodiments, the online system 140 identifies the plurality of relevant items by determining query-item relevance scores for each item, wherein a high-query relevance score represents a higher likelihood that a corresponding item will fulfill a search query. In various embodiments, the online system 140 calculates the query-item relevance scores by comparing query embeddings describing characteristics of the search query and item embeddings describing characteristics of items available through the online system. The online system 140 may retrieve a plurality of relevant items having query-item relevance scores above a threshold value, or may retrieve a set number of relevant items, e.g., fifty relevant items having the highest query-item relevance scores.

The online system 140 determines 515 baseline interaction rates for each item of the plurality of relevant items. The baseline interaction rate describes an expected likelihood of interaction by a user with the item (e.g., an expected likelihood of conversion, click-through, adding the item to cart, etc.). In some embodiments, the baseline interaction rate of an item is based at least, in part, on historic interaction rate data for the item, the historic interaction rate data describing previous interactions for the item on the online system 140.

In cases where items lack sufficient historic interaction rate data (e.g., cold start items that are new or newer to the online system 140), the online system may use historic interaction rate data associated with other relevant items to predict a baseline interaction rate rather than relying on insufficient historic interaction rate data. In some embodiments, the online system 140 identifies relevant items based on shared item embeddings between items, e.g., identifying items that are similar to the cold start item. In other embodiments, the online system 140 identifies relevant items based on similar item-query relevance scores, e.g., such that two items having similar item-query relevance scores are likely to perform similarly with respect to a given search query. The online system 140 may identify one or more relevant items to a cold start item to predict a baseline interaction rate for the cold start item. The online system 140 may calculate a predicted baseline interaction for the cold start item by compiling or averaging historic interaction rate data for the one or more relevant items, e.g., by substituting the historic interaction rate data for the one or more relevant items in for the insufficient historic interaction rate data of the cold start item itself.

In some embodiments, the online system 140 may correct or discount historic interaction rate data when the data is associated with lower-ranked positions on interfaces of the online system. For example, historic interaction rate data collected for an item presented at the bottom of an interface of the online system 140 may reflect poor performance for the item, while historic interaction rate data collected for the same item presented at the top of an interface of the online system may reflect better performance of the same item. In various embodiments, the online system 140 may apply set discounts, e.g., 0.95×, 0.75×, or other multipliers, based on positional information associated with historic interaction rate data.

Responsive to the baseline interaction rates being calculated, the online system 140 determines 520 a user interaction rate for each item of the plurality of relevant items. In some embodiments, the user interaction rate is determined based at least, in part, on the baseline interaction rate for the item. In some embodiments, the user interaction rate is additionally or instead determined based at least, in part, on one or more user embeddings describing the user of the online system 140, the user embeddings used to predict a likelihood of the user interacting with a given item of the plurality of items.

The online system 140 ranks 525 the plurality of relevant items based on the user interaction rate and selects 530 one or more items of the plurality of relevant items for presentation to the user on the online system. In various embodiments, the online system 140 may receive and store information describing user selection of one or more items responsive to the user being presented with the selected items.

In various embodiments, as the online system 140 gathers and stores user selection data, the online system 140 may modify the baseline interaction rate to include new data. Thus, as items (particularly cold start items) accrue historic interaction rate data, the online system 140 may determine their corresponding baseline interaction rates by blending the historic interaction rate data of the cold start items with historic interaction rate data of similar items. The blending function may be a weighted average, where the weights are determined based on the amount of historical interaction rate data available for the cold-start item. For example, initially, the predicted baseline interaction rate may be weighted more heavily, while over time, as more data is collected, the actual interaction rate will be weighted more heavily.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, for a user of an online system, a search query;

retrieving, by the online system, a plurality of relevant items, the plurality of relevant items selected based at least in part on query-item relevance scores describing expected relevance of items to the search query;

generating, for each item of the plurality of relevant items, a baseline interaction rate, the baseline interaction rate generated based at least in part on historic interaction rate data wherein generating the baseline interaction rate further comprises:

determining that an item of the plurality of items is associated with less than a threshold amount of historic item interaction rate data;

retrieving one or more other items similar to the item;

retrieving historic item interaction rate data associated with the one or more other items; and generating the baseline interaction rate based on the historic item interaction rate data associated with the one or more other items;

ranking the plurality of relevant items based at least in part on the baseline interaction rate;

based on the ranking, selecting one or more items of the plurality of relevant items for presentation to the user of the online system; and causing a device of the user to display the selected one or more items.

2. The method of claim 1, wherein the baseline interaction rate is generated based at least, in part, on positional information associated with the historic interaction rate data, the positional information describing a position of the item on an interface of the online system.

3. The method of claim 2, wherein generating the baseline interaction rate based on positional information further comprises discounting historic interaction rate data associated with instances of the item being presented in lower positions on the interface of the online system.

4. The method of claim 1, further comprising:

receiving a user selection of at least one item of the selected one or more items;

storing data describing the user selection as historic interaction rate data with respect to the search query; and updating the baseline interaction rate for each item of the selected one or more items based on the stored data.

5. The method of claim 1, wherein the one or more similar items are retrieved by:

obtaining an item embedding for the item;

obtaining item embeddings for each of the one or more other items; and comparing the item embeddings for the item and the one or more other items.

6. The method of claim 1, further comprising:

updating the baseline interaction rate for the item responsive to receiving new item interaction rate data, wherein updating the baseline interaction rate comprises blending the new item interaction rate data with the historic item interaction rate data associated with the one or more other items.

7. The method of claim 6, wherein the new item interaction rate data for the item is blended with the historic item interaction rate data associated with the one or more other items using a total amount of historic interaction rate data for the item.

8. The method of claim 1, wherein the baseline interaction rate is modeled as a beta distribution.

9. A computer program product comprising a non-transitory computer-readable storage medium having instructions encoded thereon that, when executed by a processor, cause the processor to perform steps comprising:

receiving, for a user of an online system, a search query;

retrieving, by the online system, a plurality of relevant items, the plurality of relevant items selected based at least in part on query-item relevance scores describing expected relevance of items to the search query;

generating, for each item of the plurality of relevant items, a baseline interaction rate, the baseline interaction rate generated based at least in part on historic interaction rate data wherein generating the baseline interaction rate further comprises:

determining that an item of the plurality of items is associated with less than a threshold amount of historic item interaction rate data;

retrieving one or more other items similar to the item;

retrieving historic item interaction rate data associated with the one or more other items; and generating the baseline interaction rate based on the historic item interaction rate data associated with the one or more other items;

ranking the plurality of relevant items based at least in part on the baseline interaction rate;

based on the ranking, selecting one or more items of the plurality of relevant items for presentation to the user of the online system; and causing a device of the user to display the selected one or more items.

10. The non-transitory computer-readable storage medium of claim 9, wherein the baseline interaction rate is generated based at least, in part, on positional information associated with the historic interaction rate data, the positional information describing a position of the item on an interface of the online system.

11. The non-transitory computer-readable storage medium of claim 10, wherein generating the baseline interaction rate based on positional information further comprises discounting historic interaction rate data associated with instances of the item being presented in lower positions on the interface of the online system.

12. The non-transitory computer-readable storage medium of claim 9, wherein the instructions further cause the processor to perform steps comprising:

receiving a user selection of at least one item of the selected one or more items;

storing data describing the user selection as historic interaction rate data with respect to the search query; and updating the baseline interaction rate for each item of the selected one or more items based on the stored data.

13. The non-transitory computer-readable storage medium of claim 9, wherein the one or more similar items are retrieved by:

obtaining an item embedding for the item;

obtaining item embeddings for each of the one or more other items; and comparing the item embeddings for the item and the one or more other items.

14. The non-transitory computer-readable storage medium of claim 9, wherein the instructions further cause the processor to perform the step:

updating the baseline interaction rate for the item responsive to receiving new item interaction rate data, wherein updating the baseline interaction rate comprises blending the new item interaction rate data with the historic item interaction rate data associated with the one or more other items.

15. The non-transitory computer-readable storage medium of claim 14, wherein the new item interaction rate data for the item is blended with the historic item interaction rate data associated with the one or more other items using a total amount of historic interaction rate data for the item.

16. The non-transitory computer-readable storage medium of claim 9, wherein the baseline interaction rate is modeled as a beta distribution.

17. A computer program product, comprising:

a processor that executes instructions; and a non-transitory computer-readable storage medium having instructions executable by the processor for:

receiving, for a user of an online system, a search query;

retrieving, by the online system, a plurality of relevant items, the plurality of relevant items selected based at least in part on query-item relevance scores describing expected relevance of items to the search query;

generating, for each item of the plurality of relevant items, a baseline interaction rate, the baseline interaction rate generated based at least in part on historic interaction rate data wherein generating the baseline interaction rate further comprises:

determining that an item of the plurality of items is associated with less than a threshold amount of historic item interaction rate data;

retrieving one or more other items similar to the item:

retrieving historic item interaction rate data associated with the one or more other items; and generating the baseline interaction rate based on the historic item interaction rate data associated with the one or more other items;

ranking the plurality of relevant items based at least in part on the baseline interaction rate;

based on the ranking, selecting one or more items of the plurality of relevant items for presentation to the user of the online system; and causing a device of the user to display the selected one or more items.

18. The computer program product of claim 17, wherein the baseline interaction rate is generated based at least, in part, on positional information associated with the historic interaction rate data, the positional information describing a position of the item on an interface of the online system.

* * * * *